US008589582B2

(12) United States Patent
Melsen et al.

(10) Patent No.: US 8,589,582 B2
(45) Date of Patent: Nov. 19, 2013

(54) BROADBAND NETWORK ACCESS

(75) Inventors: Torben Melsen, Holstebro (DK); Ole Helleberg Andersen, Bording (DK); Jørgen Karkov, Struer (DK)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 232 days.

(21) Appl. No.: 13/133,461

(22) PCT Filed: Dec. 3, 2009

(86) PCT No.: PCT/SE2009/051370
§ 371 (c)(1),
(2), (4) Date: Jun. 8, 2011

(87) PCT Pub. No.: WO2010/068163
PCT Pub. Date: Jun. 17, 2010

(65) Prior Publication Data
US 2011/0246663 A1 Oct. 6, 2011

Related U.S. Application Data

(60) Provisional application No. 61/120,527, filed on Dec. 8, 2008.

(51) Int. Cl.
*G06F 15/16* (2006.01)
*G06F 15/173* (2006.01)
(52) U.S. Cl.
USPC .............................. 709/232; 709/230; 709/246

(58) Field of Classification Search
None
See application file for complete search history.

(56) References Cited

U.S. PATENT DOCUMENTS

| 7,467,214 | B2 * | 12/2008 | Chin ............................. 709/230 |
| 7,774,477 | B2 * | 8/2010 | Zintel et al. .................. 709/227 |
| 2005/0018651 | A1 * | 1/2005 | Yan et al. ...................... 370/352 |
| 2007/0268919 | A1 | 11/2007 | Sarikaya et al. |
| 2010/0017497 | A1 * | 1/2010 | Brown et al. ................. 709/217 |

OTHER PUBLICATIONS

Wen, Haibo Port Identifier Option for RS/RA Message in IPv6 Access Network. IETF IPv6 Working Group. Jun. 23, 2006.

* cited by examiner

*Primary Examiner* — John B. Walsh

(57) ABSTRACT

A method and Access Network Node for handling dissimilar protocols when a Host accesses a Broadband Network. The Access Network Node includes a protocol converter for interworking between the Neighbor Discovery (ND) protocol and the Dynamic Host Configuration Protocol (DHCP). When an ND Router Solicitation message is received from a Host that does not support DHCP, the converter converts the ND message to a DHCP Solicit message and forwards it to a Broadband Network Gateway (BNG) together with a port ID. When the Access Network Node receives a DHCP Reply message from the BNG destined for the same Host, the converter converts the DHCP Reply message to an ND Router Advertisement message before sending it to the Host.

12 Claims, 4 Drawing Sheets

//BROADBAND NETWORK ACCESS

This application claims the benefit of U.S. Provisional Application No. 61/120,527, filed Dec. 8, 2008, the disclosure of which is fully incorporated herein by reference.

TECHNICAL FIELD

The present invention relates generally to communications networks. In particular, and not by way of limitation, the invention is directed to a method and protocol converter for handling dissimilar protocols when accessing a Broadband Network.

BACKGROUND

The present invention is related to the Broadband Network system as described in the technical requirements document, TR-101 (from Broadband Forum). The current version of the TR-101 document focuses on IPv4 and it is currently being extended with IPv6 functionality (WT-177).

A basic principle of the TR-101 is the ability for the Access Network (AN) to insert a DSL port-related identity into messages sent toward the Broadband Network in order for the Broadband Network Gateway (BNG) to identify the configuration associated with that end-user on that port. Thus when an end-user requests an IP-address, and the end-user uses IPoE (as opposed to IPoPPP), the Dynamic Host Configuration Protocol (DHCP) relay agent in the access network inserts an "option 82" (with the port identity) into the DHCP request before forwarding it upstream. This enables the BNG's DHCP server to uniquely identify the end-user/port/circuit (as also specified in RFC3046) related to the DHCP request.

In IPv6, the IP address can be dynamically assigned by one of two methods: either DHCPv6 or the Neighbor Discovery (ND) protocol (as specified in RFC4861). The DHCPv6 method is handled in a manner similar to IPv4, using a DHCPv6 parameter to hold the port identification. The ND method, however, poses a problem because the current specification does not offer any parameter/attribute where the port identification can be inserted.

Some, if not most, current commercially available broadband access devices do not offer a DHCPv6 client; they only support ND. An example of such a device is the popular PC operating system, Windows XP. When such a PC is connected to a broadband network via a residential gateway such as a bridged Customer Premises Equipment (CPE), the PC initiates ND signaling with an ND Router Solicitation (RS) message and is expecting to receive an IP address via an ND Router Advertisement (RA) message in return. However, the BNG cannot identify which port the request came from and cannot associate a certain policy with the IP address assignment (for example, limiting the number of simultaneously assigned addresses for that user). Therefore, the discovery process fails. The problem is not limited to PCs, but also applies to any user equipment (routing CPE or any device behind a bridged CPE) that uses ND for IPv6 address configuration.

SUMMARY

Accordingly, there is a need for a method and protocol converter for handling dissimilar protocols when accessing a Broadband Network.

In one embodiment, the present invention provides a protocol converter for interworking between the Neighbor Discovery (ND) protocol and the Dynamic Host Configuration Protocol (DHCP). In this embodiment, the access network (on the end-user side) terminates the Neighbor Discovery protocol (RS/RA) and uses DHCPv6 signaling towards the BNG. This process/arrangement is referred to herein as an ND/DHCP Interworking Function (IWF). This invention may utilize the Prefix delegation option (DHCPv6-PD RFC3633) of DHCPv6 with or without the DHCPv6 relay agent method (e.g., according to draft-ietf-dhc-dhcpv6-Idra).

DHCPv6 is expected to be the preferable solution for IPv6 address assignment in the future. However, certain IPv6 devices are expected to support ND but not DHCPv6. The present invention advantageously supports user port identification for IPv6 devices that support ND, but not DHCPv6. This provides the BNG with a uniform way (DHCPv6) to handle address assignment to the end-user devices, independent of whether they use DHCPv6 or ND. Additionally, the invention reduces the number of messages that are sent to the BNG. Since the ND/DHCP conversion is performed in the access network, provisions do not have to be made by the IETF to handle ND in the BNG.

Thus in one embodiment, the present invention is directed to a method of handling dissimilar protocols when a Host accesses a Broadband Network. The method includes the steps of receiving in an Access Network Node, an initial discovery request from the Host; and determining by the Node whether the initial discovery request is formatted in a protocol that allows a port identity to be conveyed to a gateway in the Broadband Network. When the initial discovery request is formatted in the protocol that allows a port identity to be conveyed to the gateway, the Node forwards the initial discovery request with the port identity to the gateway. However, when the initial discovery request is not formatted in the protocol that allows the port identity to be conveyed to the gateway, the Node converts the initial discovery request to a modified discovery request formatted in the protocol that allows the port identity to be conveyed to the gateway, and sends the modified discovery request with the port identity to the gateway.

In another embodiment of the method of handling dissimilar protocols, the method includes the steps of receiving in the Access Network Node, an ND Router Solicitation request from the Host; utilizing the IWF in the Access Network Node to convert the ND Router Solicitation request to a DHCP Solicit message; and sending the DHCP Solicit message with a port identity to the BNG. The method may also include receiving in the Access Network Node, a DHCP Reply message from the BNG; utilizing the IWF in the Access Network Node to convert the DHCP Reply message to an ND Router Advertisement message; and sending the ND Router Advertisement message from the Access Network Node to the Host.

In another embodiment, the present invention is directed to an Access Network Node for handling dissimilar protocols when a Host accesses a Broadband Network. The Access Network Node includes a message analyzer for determining whether an initial discovery request received from the Host is formatted in a protocol that allows a port identity to be conveyed to a gateway in the Broadband Network; and an interworking function for converting the initial discovery request to a modified discovery request formatted in the protocol that allows the port identity to be conveyed to the gateway, when the message analyzer determines that the initial discovery request is not formatted in the protocol that allows the port identity to be conveyed to the gateway.

DETAILED DESCRIPTION

Figure 1A:
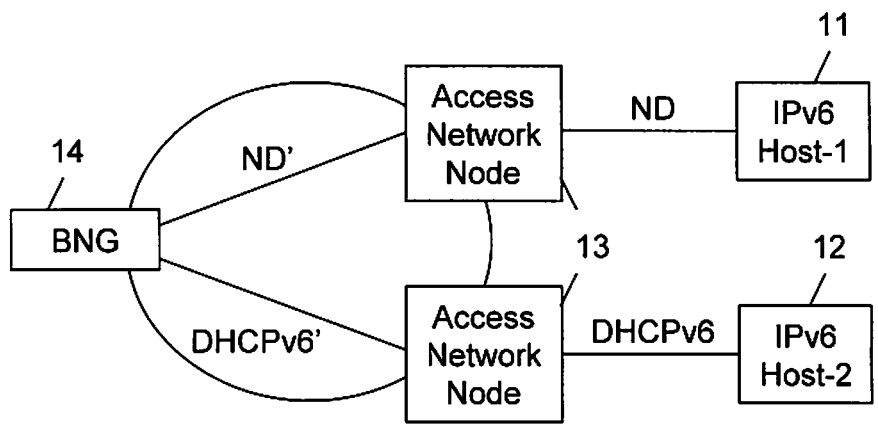
FIGS. 1A-1B are simplified block diagrams illustrating an exemplary Broadband Network access scenario without and with the ND/DHCP Interworking Function (IWF) of the present invention.
Figure 1B:
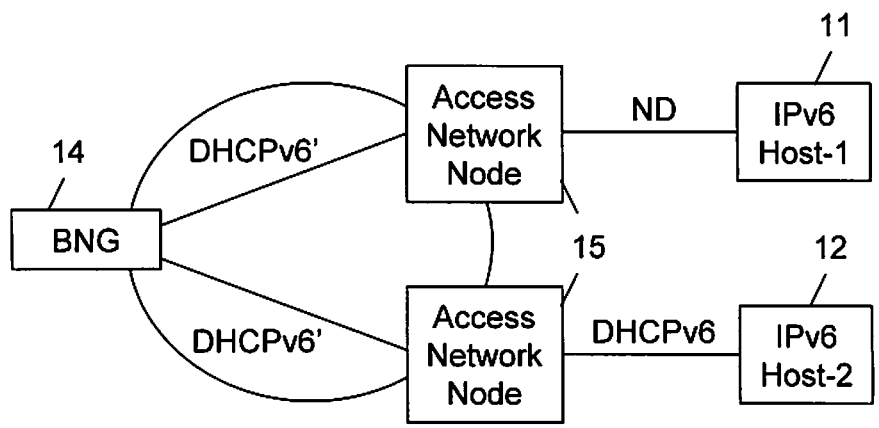

FIGS. 1A-1B are simplified block diagrams illustrating an exemplary Broadband Network access scenario without and with the ND/DHCP Interworking Function (IWF) of the present invention. Referring to FIG. 1A, a scenario without the ND/DHCP IWF of the present invention is shown. IPv6 Host-1 11 is a device that supports ND, but not DHCPv6. IPv6 Host-2 12 is a device that supports DHCPv6. Access Network Nodes 13 are conventional access network nodes, which do not include the ND/DHCP IWF of the present invention. Therefore, the access network nodes merely forward messages they receive from the hosts to the BNG 14 utilizing the same protocol with which they were received. Thus, when the Host-2 12 sends a DHCPv6 request to the Access Network Node, the Access Network Node forwards the DHCPv6 request to the BNG 14. There is no problem with this scenario since the DHCP relay agent in the Access Network Node inserts the "option 82" (with the port identity) into the DHCP request before forwarding it upstream. This enables the BNG's DHCP server to uniquely identify the end-user/port/circuit related to the DHCP request. However, when the Host-1 11 sends an ND request such as an RS message to the Access Network Node, the Access Network Node forwards the ND request to the BNG 14. In this case, the BNG cannot identify which port the request came from and cannot associate any policies with the IP address assignment.

Referring to FIG. 1B, a scenario with the ND/DHCP IWF of the present invention is shown. IPv6 Host-1 11 is again a device that supports ND, but not DHCPv6. IPv6 Host-2 12 is a device that supports DHCPv6. Access Network Nodes 15 are modified to include the ND/DHCP IWF of the present invention. When the Host-2 12 sends a DHCPv6 request to the Access Network Node, the Access Network Node forwards the DHCPv6 request to the BNG 14 as before. However, when the Host-1 11 sends an ND request such as an RS message to the Access Network Node, the ND/DHCP IWF converts the ND request to a DHCPv6 request before sending the request to the BNG 14. The ND/DHCP IWF inserts the "option 82" (with the port identity) into the DHCP request, thereby enabling the BNG's DHCP server to uniquely identify the end-user/port/circuit related to the DHCP request.

Figure 2:
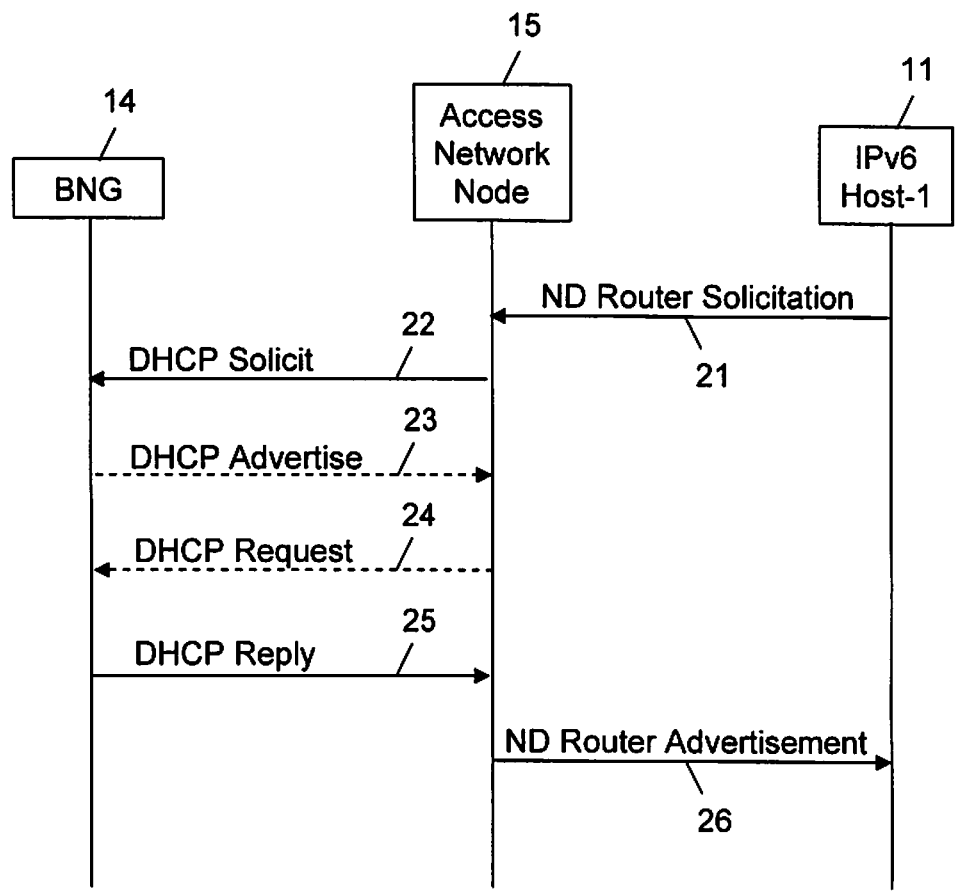
FIG. 2 is a message flow diagram illustrating the flow of messages when accessing a Broadband Network Gateway (BNG) in an exemplary embodiment of the method of the present invention.

FIG. 2 is a message flow diagram illustrating the flow of messages when accessing the BNG 14 in an exemplary embodiment of the method of the present invention. The IPv6 Host-1 11, sends a ND Router Solicitation request 21 to the Access Network Node 15. The ND/DHCP IWF in the Access Network Node converts the ND request to a DHCP Solicit message 22 and sends it to the BNG 14. The BNG returns a DHCP Advertise message 23, and the Access Network Node responds with a DHCP Request message 24. The DHCP Advertise message 23 and the DHCP Request message 24 are illustrated as dotted lines because they are not used if "Rapid Commit" is utilized. The BNG then returns a DHCP Reply message 25. The ND/DHCP IWF in the Access Network Node converts the DHCP Reply message to a ND Router Advertisement message 26.

Figure 3:
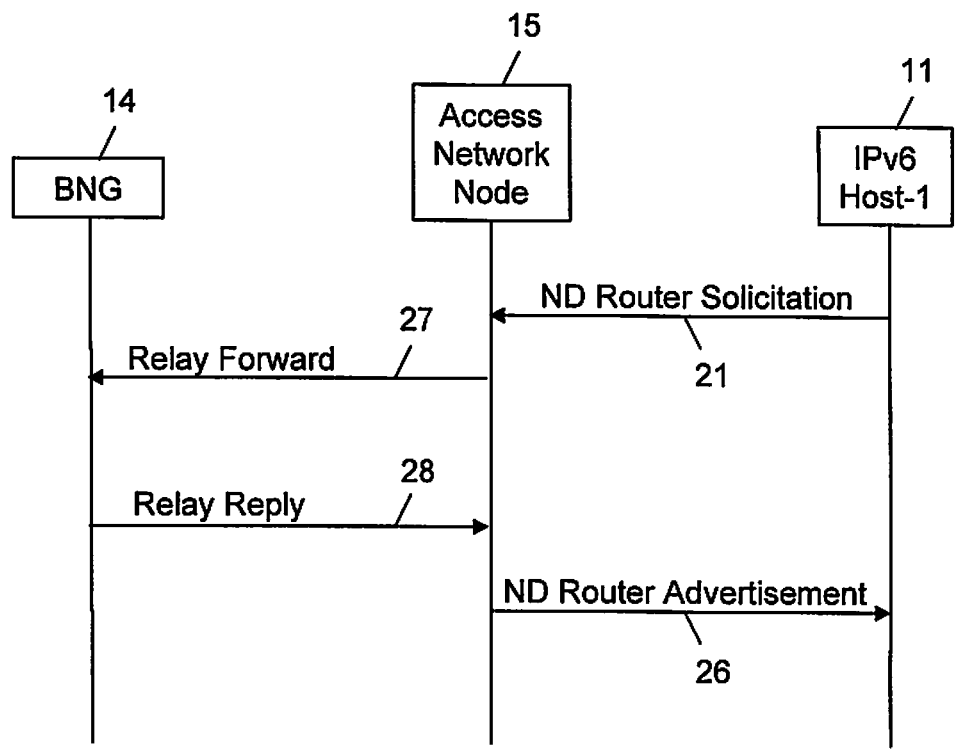
FIG. 3 is a message flow diagram illustrating the flow of messages when accessing the BNG in another exemplary embodiment of the method of the present invention.

The DHCP sequence also results in a Lifetime indication in the DHCP Reply message 25. The Access Network Node 15 indicates a slightly shorter Lifetime towards the Host-1 in the ND Router Advertisement message 26. FIG. 3 is a message flow diagram illustrating the flow of messages when accessing the BNG 14 in another exemplary embodiment of the method of the present invention. In this embodiment, the Access Network Node 15 is configured as a relay agent such as, for example, a Lightweight DHCP Relay Agent (LDRA), a fully functional DHCPv6 relay agent as specified in RFC3315, or a DHCPv6 transparent agent. Upon receiving the ND Router Solicitation request 21 from the IPv6 Host-1 11, the Access Network Node sends a Relay Forward message 27 to the BNG. The Relay Forward message is an encapsulation of a full DHCP Solicit or DHCP Request message. The BNG returns a Relay Reply message 28 to the Access Network Node. The Relay Reply message is an encapsulation of a full DHCP Advertise or DHCP Reply message. The Access Network Node then sends the ND Router Advertisement message 26 to the IPv6 Host-1.

Figure 4:
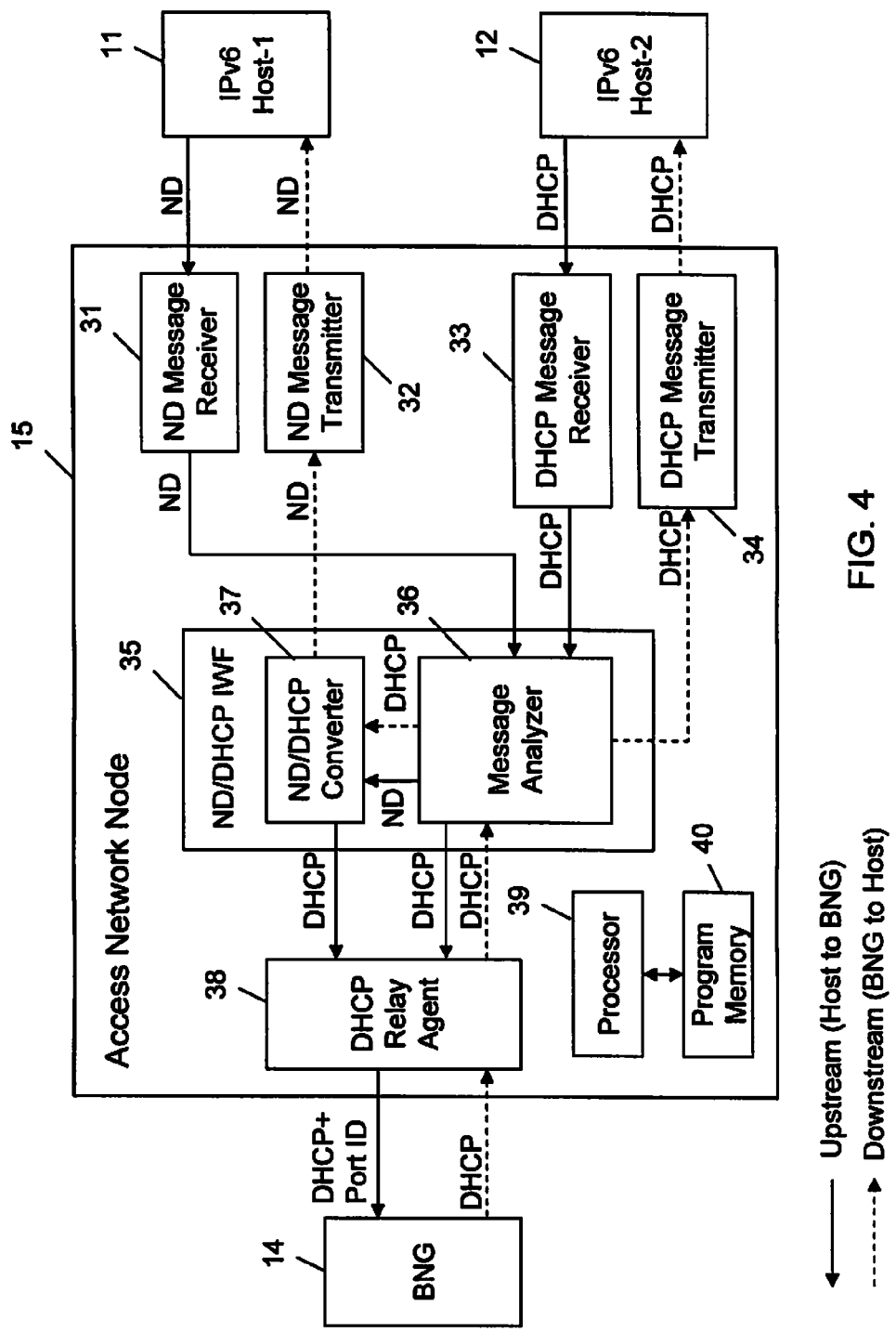
FIG. 4 is a simplified block diagram illustrating an access network node and ND/DHCP IWF in an exemplary embodiment of the present invention.

FIG. 4 is a simplified block diagram illustrating an Access Network Node 15 with an ND/DHCP IWF 35 in an exemplary embodiment of the present invention. The Access Network Node includes an ND message receiver 31 for receiving upstream ND messages such as ND Router Solicitation requests from the IPv6 Host-1 11, which is not capable of utilizing DHCP messages. An ND message transmitter 32 transmits ND messages such as ND Router Advertisement messages downstream to the IPv6 Host-1. Similarly, a DHCP message receiver 33 receives upstream DHCP messages from IPv6 Host-2 12, which is DHCP capable. A DHCP message transmitter 34 transmits downstream DHCP messages to the IPv6 Host-2.

The ND message receiver 31 supplies received upstream messages to a message analyzer 36, which determines whether a received message is an ND message or a DHCP message. If the received message is an ND message, the message is provided to an ND/DHCP converter 37, which converts the ND message to a DHCP message and forwards it to a DHCP Relay Agent 38. The DHCP Relay Agent may be, for example, an LDRA, a fully functional DHCPv6 relay agent as specified in RFC3315, or a DHCPv6 transparent agent. If the received message is a DHCP message, the message analyzer may provide the message directly to the DHCP Relay Agent. In either case, the DHCP Relay Agent forwards the DHCP message together with a Port ID to the BNG 14.

Downstream DHCP messages from the BNG 14 are received by the DHCP Relay Agent 38 and are provided to the message analyzer 36. If the downstream DHCP message is destined to IPv6 Host-1 11, which is not DHCP capable, the message analyzer forwards the message to the ND/DHCP converter 37. The ND/DHCP converter converts the DHCP message to an ND message and provides the ND message to the ND message transmitter 32 for transmission to the IPv6 Host-1. If the downstream DHCP message is destined to IPv6 Host-2 12, which is DHCP capable, the message analyzer may forward the message directly to the DHCP message transmitter 34 for transmission to the IPv6 Host-2.

All of the operations of the Access Network Node 15 and the ND/DHCP IWF 35 may be controlled by a processor 39 running computer program instructions stored on a program memory 40.

The present invention also allows use of Unsolicited Router Advertisements sent downstream from the Access Network Node towards the host. Unsolicited RA's are sent periodically without being triggered by an RS. The AN may send out an Unsolicited RA based on DHCP information received previously from the BNG/DHCP.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of handling dissimilar protocols when a Host accesses a Broadband Network, said method comprising the steps of:
   receiving in an Access Network Node, an initial discovery request from the Host;
   determining by the Access Network Node whether the initial discovery request is formatted in a protocol that allows a port identity to be conveyed to a gateway in the Broadband Network;
   upon determining the initial discovery request is formatted in the protocol that allows a port identity to be conveyed to the gateway, inserting the port identity into the initial discovery request and forwarding the initial discovery request with the port identity from the Access Network Node to the gateway;
   upon determining the initial discovery request is not formatted in the protocol that allows the port identity to be conveyed to the gateway:
      converting by the Access Network Node, the initial discovery request to a modified discovery request formatted in the protocol that allows the port identity to be conveyed to the gateway,
      inserting the port identity into the modified discovery request; and
      sending the modified discovery request with the port identity from the Access Network Node to the gateway.

2. The method according to claim 1, wherein:
   the initial discovery request is a Neighbor Discovery (ND) Router Solicitation request; and
   the modified discovery request is a Dynamic Host Configuration Protocol (DHCP) Solicit message.

3. The method according to claim 1, further comprising the steps of:
   receiving in the Access Network Node, an initial reply message from the gateway;
   determining by the Access Network Node whether the initial reply message is formatted in a protocol compatible with the Host;
   upon determining the initial reply message is formatted in the protocol compatible with the Host, forwarding the initial reply message from the Access Network Node to the Host;
   upon determining the initial reply message is not formatted in the protocol compatible with the Host:
      converting by the Access Network Node, the initial reply message to a modified reply message formatted in the protocol compatible with the Host; and
      sending the modified reply message from the Access Network Node to the Host.

4. The method according to claim 3, wherein:
   the initial reply message is a Dynamic Host Configuration Protocol (DHCP) Reply message; and
   the modified reply message is a Neighbor Discovery (ND) Router Advertisement message.

5. The method according to claim 3, wherein the initial reply message includes a Lifetime indication, and the step of converting the initial reply message to a modified reply message includes the step of the Access Network Node including in the modified reply message, a modified Lifetime indication shorter than the Lifetime indication received in the initial reply message.

6. The method according to claim 1, wherein:
   the receiving step includes receiving in the Access Network Node, a Neighbor Discovery (ND) Router Solicitation request from the Host;
   the converting step includes utilizing an interworking Function, IWF, in the Access Network Node to convert the ND Router Solicitation request to a Dynamic Host Configuration Protocol (DHCP) Solicit message; and
   the sending step includes sending the OHCP Solicit message with a port identity from the Access Network Node to a Broadband Network Gateway, BNG;
   wherein the method further comprises the steps of:
   receiving in the Access Network Node, a DHCP Reply message from the BNG;
   utilizing the IWF in the Access Network Node to convert the DHCP Reply message to an ND Router Advertisement message; and
   sending the ND Router Advertisement message from the Access Network Node to the Host.

7. The method according to claim 6, wherein a rapid commit procedure is not utilized, and the method also includes, after sending the DHCP Solicit message with a port identity to the BNG, the steps of:
   receiving in the Access Network Node, a DHCP Advertise message from the BNG; and
   sending a DHCP Request message from the Access Network Node to the BNG in response to the DHCP Advertise message.

8. An Access Network Node for handling dissimilar protocols when a Host accesses a Broadband Network, said Access Network Node comprising:
   a memory for storing computer program instructions; and
   a processor coupled to the memory, wherein when the processor executes the computer program instructions, the Access Network Node is caused to:
      determine using a message analyzer, whether an initial discovery request received from the Host is formatted in a protocol that allows a port identity to be conveyed to a gateway in the Broadband Network; and
      convert using an interworking function, the initial discovery request to a modified discovery request formatted in the protocol that allows the port identity to be inserted into the modified discovery request and conveyed to the gateway, when the message analyzer determines that the initial discovery request is not formatted in the protocol that allows the port identity to be conveyed to the gateway.

9. The Access Network Node according to claim 8, wherein the initial discovery request is formatted in the protocol that allows the port identity to be conveyed to the gateway, and the Access Network Node is adapted to forward the initial discovery request with the port identity to the gateway without conversion.

10. The Access Network Node according to claim 9, wherein:
   the initial discovery request is a Neighbor Discovery (ND) Router Solicitation request; and
   the modified discovery request is a Dynamic Host Configuration Protocol (DHCP) Solicit message.

11. The Access Network Node according to claim 8, wherein:
   the message analyzer is also configured to determine whether an initial reply message received from the gateway is formatted in a protocol compatible with the Host; and
   the interworking function includes a Neighor Discover/Dynamic Host Configuration Protocol converter configured to convert the initial reply message to a modified reply message formatted in the protocol compatible with the Host.

12. The Access Network Node according to claim 11, wherein:
   the initial reply message is a Dynamic Host Configuration Protocol (DHCP) Reply message; and
   the modified reply message is a Neighbor Discovery (ND) Router Advertisement message.

* * * * *

UNITED STATES PATENT AND TRADEMARK OFFICE
CERTIFICATE OF CORRECTION

PATENT NO.         : 8,589,582 B2
APPLICATION NO.    : 13/133461
DATED              : November 19, 2013
INVENTOR(S)        : Melsen et al.

It is certified that error appears in the above-identified patent and that said Letters Patent is hereby corrected as shown below:

In the Claim:

In Column 6, Line 23, in Claim 6, delete "OHCP" and insert -- DHCP --, therefor.

In Column 7, Lines 13-14, in Claim 11, delete "Discover/Dynamic" and insert -- Discovery/Dynamic --, therefor.

Signed and Sealed this
Twentieth Day of May, 2014

Michelle K. Lee
*Deputy Director of the United States Patent and Trademark Office*